United States Patent [19]

Metz

[11] Patent Number: 4,709,776

[45] Date of Patent: Dec. 1, 1987

[54] AUTOMATIC POWER DOOR LOCK SYSTEM

[75] Inventor: Marcus C. Metz, Canton, Mich.

[73] Assignee: Chrysler Motors Corporation, Highland Park, Mich.

[21] Appl. No.: 882,568

[22] Filed: Jul. 7, 1986

[51] Int. Cl.⁴ .............................................. B60K 28/12
[52] U.S. Cl. ...................................... 180/281; 70/264; 307/10 R
[58] Field of Search .......................... 180/281; 70/264; 307/10 R, 10 LS

[56] References Cited

U.S. PATENT DOCUMENTS

| 3,722,615 | 3/1973 | Okada et al. | 180/281 |
| 3,765,502 | 10/1973 | Mark | 180/281 |
| 4,122,371 | 10/1978 | Talmage | 307/10 LS |

Primary Examiner—John J. Love
Assistant Examiner—Karin L. Ferriter
Attorney, Agent, or Firm—Wendell K. Fredericks

[57] ABSTRACT

Circuits are provided that automatically lock electric power door locks of a motor vehicle at a predetermined speed.

Also, the system includes circuits for automatically relocking the electric power door locks if the doors come open or ajar. Provisions are made to inhibit the dome light switch which turns on the dome light from actuating the automatic door lock system and automatically locking the doors since the door jamb switch and the dome light switch are usually connected in the same circuit to turn on the dome light.

5 Claims, 2 Drawing Figures

AUTOMATIC POWER DOOR LOCK SYSTEM

BACKGROUND OF THE INVENTION

(1) Field of the Invention

This invention relates to automatic door lock circuits for motor vehicles and more specifically to circuits of the type which automatically locks the door locks if a door is opened or becomes ajar and the vehicle is driven at a predetermined speed.

(2) Description of the Prior Art

It is well known in the prior art to provide automatic door locking systems that lock when a predetermined speed is reached. Various electrical control arrangements have been devised for automatically locking vehicle doors.

One arrangement is described in U.S. Pat. No. 3,765,502 dated Oct. 16, 1973 of D. E. Mark. There, an electrical signal of a predetermined duration is generated for automatically locking door lock solenoids when the vehicle reaches a predetermined speed. Such a system appears to provide a relock signal after the door had been previously locked, but no provisions are made for relocking the door locks if the door becomes ajar.

Another vehicle door locking system is described in U.S. Pat. No. 3,722,615 dated Mar. 27, 1973 of Okada et al. There logic and discrete circuits are used to effect automatic locking when the vehicle reaches a certain speed. This system also doesn't consider relocking the door locks after a door becomes ajar while the vehicle is traveling at a predetermined speed.

SUMMARY OF THE INVENTION

The present invention relates to an automatic door locking system for motor vehicles with power door locks. This system provides means for automatically locking all doors when the vehicle reaches a predetermined speed. Means are provided for automatically locking the door locks if after the ignition is turned on a door is opened or becomes ajar. The automatic door locking occurs after the vehicle reaches a predetermined speed.

DETAILED DESCRIPTION OF A PREFERRED EMBODIMENT

Figure 1:
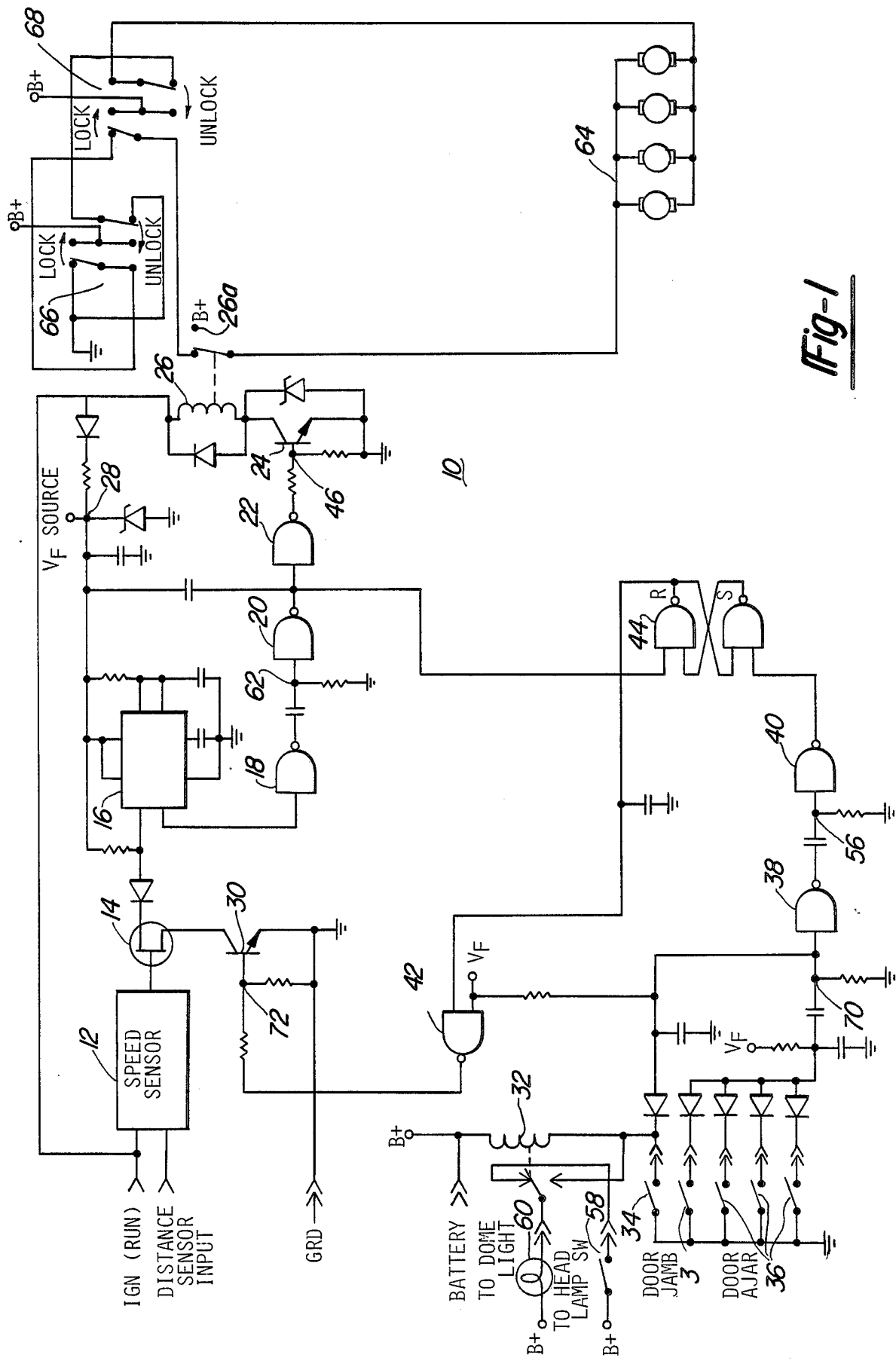
FIG. 1 is a schematic diagram of a preferred embodiment of the invention.

Referring to the drawing figures, in FIG. 1 there is shown a schematic diagram of an automatic power door lock system 10. A vehicle storage battery provides B+ and system ground for system 10. This power permits manual operation of the power door locks prior to turning on the vehicle ignition. When the ignition switch is turned to the "RUN" position, the output voltage of the battery is regulated by a voltage regulating circuit 28 to produce a voltage source ($V_F$) suitable for use by the logic circuits of system 10.

System 10 includes door locks (not shown) which are mechanically linked to electric reversible locking motors 64. Left front door lock/unlock switch 66 and right front door lock/unlock switch 68 are used to actuate locking motors 64. Switches 66 and 68 can be used at any time to manually lock or unlock the power door locks. These switches may even be used to override the automatic power door locking operations of system 10.

The automatic locking of the power door locks results when the voltage $V_F$ source is available to system 10, at least one door of the vehicle is opened and then closed, but unlocked and the vehicle is traveling over a predetermined speed, e.g., 15 mph. The automatic relocking of the power door locks occurs when at least one door is opened or becomes ajar while the vehicle is traveling at 15 mph and after a door had been previously locked. When traveling below 15 mph, if at least one door is opened or becomes ajar, system 10 will not automatically relock the door locks until the vehicle speed reaches 15 mph.

When the regulated voltage $V_F$ source becomes available to system 10, and the doors of the vehicle are closed, flip-flop 44 is placed in a reset state. With flip-flop 44 in a reset state, the output of the flip-flop latches into this state until the flip-flop is instructed otherwise. A logic high voltage signal is applied from the output gate of flip-flop 44 to the input of NAND gate 42 which inhibits or disarms system 10. To arm system 10, flip-flop 44 must be placed in a set state. To set flip-flop 44, either a door jamb switch 34 or a door ajar switch 36 must be closed at least momentarily so as to place a logic low voltage signal on the set input of flip-flop 44.

The door ajar switch 36, located in each vehicle door, has normally open switch contacts when the door is closed, but has closed switch contacts when the door is opened. The door ajar switch 36 is used in system 10 to indicate door ajar status. A system 10, armed by a closed door ajar switch, will cause the locking motors 64 to drive so as to lock the power door locks of the vehicle.

The door jamb switch 34 usually located in the door jamb of one or both of the front doors of the vehicle also has normally opened contacts when the door is closed and closed contacts when the door is opened. The door jamb switch 34 operates independent of the door ajar switch because the door jamb switch 34, but not the door ajar switch 36, is used to turn on the vehicle dome light 60 when the door, equipped with a door jamb switch, is opened. The vehicle dome light is normally located in the roof of the passenger compartment of the vehicle and is also turned on when a headlamp switch 58 is closed.

Since the closed contacts of the door jamb switch 34 and the headlamp switch 58 are used to turn on the dome light 60, but only the door jamb switch contacts are used to initiate automatic locking and relocking of the vehicle door locks, a relay 32 is employed to isolate headlamp switch operations from door jamb switch operations.

As shown in FIG. 1, headlamp switch 58 can be used to light domelight 60 independent of the door jamb switch 34 via the normally closed contact of relay 32. Doro jamb switch 34 operates identical to headlamp switch 58 in turning on domelight 60 when the vehicle's engine isn't running. However, when the engine is running, IGN (RUN) voltage is used to provide a regulated $V_F$ source voltage, illustratively of 12 volts D.C. The $V_F$ source voltage is used to supply power to the logic circuits of the automatic power door lock system 10, and it is used to supply power to relay 32. This arrangement permits door jamb switch 34 and headlamp switch 58 to operate normally to light domelight 60 prior to starting the engine and permits door jamb switch 34 but not headlamp switch 58 to initiate automatic locking of the power door locks.

To explain the logic which supports the above actions first consider the case of the doors automatically locking when vehicle speed exceeds 15 mph. If a door is opened or becomes ajar after the vehicle is running, then flip-flop 44 is placed in a set state. A logic low voltage from the reset output is applied to an input of NAND gate 43 along with a logic high voltage being applied to the other input of gate 42. This produces a logic high voltage output from gate 42 which is applied to base bias.

A conventional speed sensor circuit 12 having a digital input of, e.g., 8000 pulses per mile provides an output signal which is a logic low voltage level when the vehicle is traveling below 15 mph and a logic high voltage level when the vehicle is traveling above 15 mph. This output signal is applied to the input of a field effect transistor (FET) 14. FET 14 is made non-conductive if the signal from the speed sensor circuit 12 is a logic low voltage and is made conductive if the input signal is a logic high voltage.

When transistor 14 turns on, it sets up a timing circuit in a monostable multivibrator circuit 16. The timing circuit times out, illustratively within two seconds. A logic low voltage output from circuit 16 is applied to an input of NAND gate 18. The output from gate 18 is applied to a delay circuit 62 which illustratively forms a one second inverted pulse which is applied to an input of NAND gate 20. Gate 20 again inverts the pulse and applies it to NAND gate 22 and to the reset input of flip-flop 44 resetting the flip-flop. The output of gate 22, illustratively a one second positive going pulse is applied to a base bias circuit 46 which provides base current to turn on NPN transistor 24 momentarily. Turning on transistor 24 momentarily energizes relay 26, illustratively for one second, a sufficient duration for driving lock motors 64 to lock without overdriving them. Contact 26A of relay 26 closes applying B+ to one side of reversible motors 64 which drives the motors in a direction to automatically lock the doors. The other side of motor 64 is ground via closed contacts of lock-/unlock switches 66 and 68.

As mentioned before, the output of gate 20 resets flip-flop 44. Upon resetting flip-flop 44 a logic low voltage from the reset output thereof is applied to an input of gate 42; the logic low voltage output of gate 42 is applied to the base bias circuit 72 turning transistor 30 off, removing the ground to FET 14 thus rendering it non-conductive. With FET 14 turned off, the speed sensor circuit 12 is inhibited.

Figure 2:
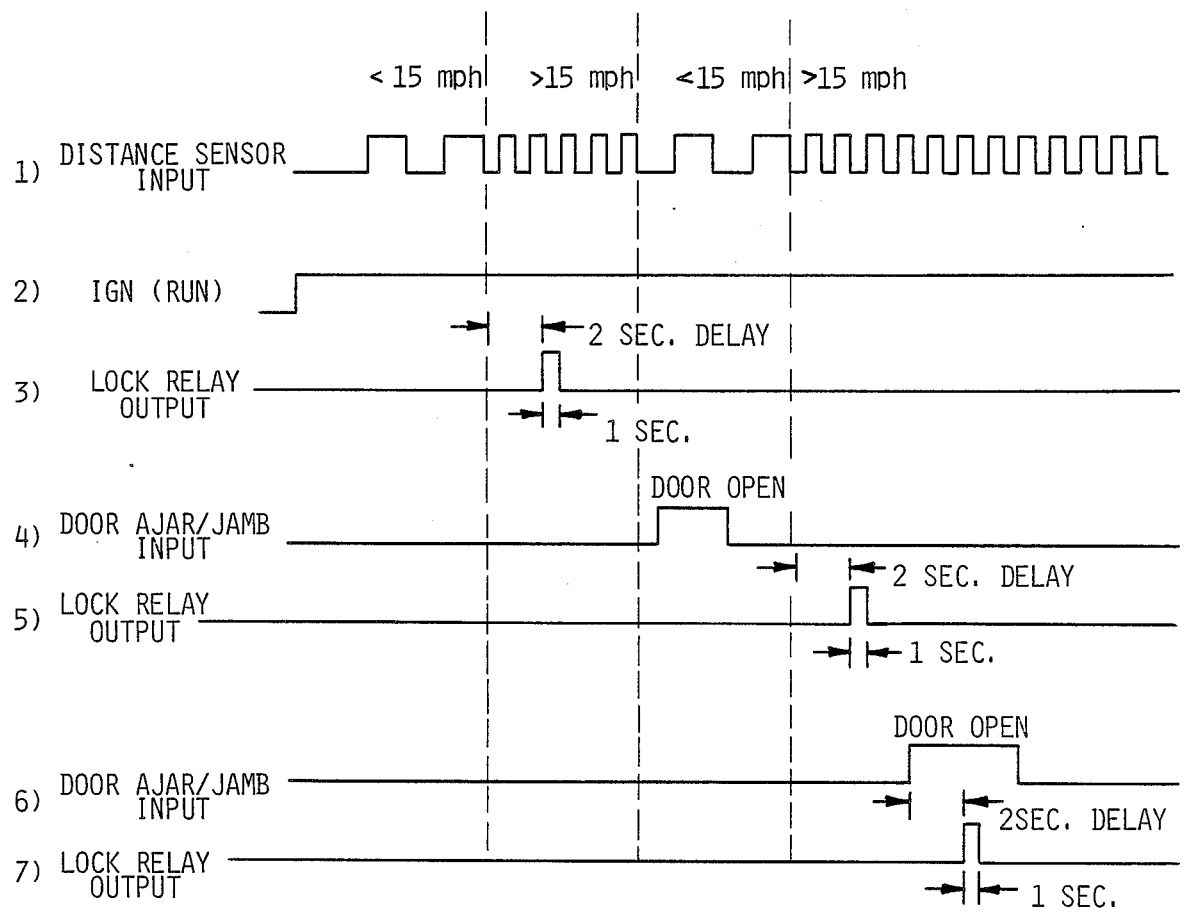
FIG. 2, is a timing diagram depicting time sequences of event which take place during the operation of the invention.

However, if a door is opened and then closed or becomes ajar, either door jamb switch 34 or door ajar switches 36 will apply a logic low voltage to gate 38 which is inverted and the inverted signal applied to gate 40 which again inverts the signal causing a logic low voltage to be applied to flip-flop 44 which sets it. The low reset output of flip-flop 44 is applied to the input of gate 42 whose output causes base bias current in circuit 72 to flow which turns on transistor 30. Since FET 14 does not become conductive until speed sensor 12 senses 15 mph, the monostable multivibrator circuit 12 is not activated if the vehicle is going less than 15 mphs. If the vehicle is going 15 mph or more and the door is opened or is ajar, the sequence is repeated which causes relay 26 to drive the lock motors on for about one second to lock the doors. FIG. 2 is a timing diagram depicting the time relationships between the distance sensor digital pulses (line 1), the one-second application of voltage to the lock motors 64 by the lock relay 26 (lines 3, 5 and 7) and the momentary closure of a door ajar or door jamb switch which arms system 10 (lines 4 and 6). Note that lines 1 and 3 depict that approximately two seconds after the vehicle exceeds 15 mph, the lock relay is energized for one second and that the door locks are automatically locked.

Lines 1 and 4 illustrate that system 10 is not affected by a door being opened and reclosed or ajar when the vehicle is traveling less than 15 mph.

Lines 1 and 5 depict that approximately two seconds after the vehicle exceeds 15 mph, and even though the door had been opened and reclosed or ajar when the vehicle was traveling under 15 mph, the lock relay will again energize for one second and the doors will automatically lock.

Lines 1, 6 and 7 depict automatic locking of the door locks by lock relay 26 two seconds after a door is opened or becomes ajar. Note also that locking of the locks usually occurs prior to the door being closed.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. An automatic power door lock system for automatically locking door locks of a motor vehicle after a door is opened or becomes ajar while the ignition of the vehicle is on and after the vehicle reaches a predetermined speed, said system comprising:
   (a) speed sensor means connected to a distance sensor of the vehicle for providing to the system a pulse signal indicative of the speed of the vehicle so that the system will know when the vehicle reaches the predetermined speed;
   (b) door jamb switch means mechanically connected to the door of the vehicle for providing an electrical signal to the system indicative of the door being opened;
   (c) a door ajar switch mechanically connected to the door and having a switch contact connected between an electrical signal source and said door jamb switch means for providing an electrical signal to the system indicative of the door being in an ajar position; and
   (d) a drive means connected to the door lock for driving the lock to a lock position; and
   (e) bi-stable latch means interconnected to said speed sensor means, said door jamb switch means and said drive means responsive to the electrical signal from said door jamb switch means indicating the door being opened or ajar and to the speed of the vehicle pulse signal from said speed sensor means, for providing an electrical signal to said drive means to cause said drive means to drive the door lock to a lock position when the vehicle reaches the predetermined speed.

2. Apparatus in accordance with claim 1 wherein said door jamb switch means includes a door jamb switch mounted in a door jamb of the vehicle having a switch contact interconnected to the electrical signal source, said switch contact of said door ajar switch and a time delay circuit means, said time delay circuit means providing a path that delays for a predetermined time period, the electrical signal that is transferred between said door jamb switch means and said bi-stable latch means when said switch contact of said door ajar switch or said door jamb switch closes to provide a path for the electrical signal from the electrical source.

3. Apparatus in accordance with claim 2 wherein said door jamb switch means includes means for said door jamb switch to operate a vehicle dome light independent of a headlamp switch having a switch contact for operating the dome light.

4. Apparatus in accordance with claim 1 wherein said bi-stable latch means includes:
   (a) a mono-stable multivibrator circuit connected to said drive means for providing a pulse of a chosen duration sued by said drive means for driving the door lock to the lock position; and
   (b) an electronic switch means interconnected between said speed sensor means and said drive means for switching on said mono-stable multivibrator circuit in response to receive of the pulse signal indication from said speed sensor means and the door being opened or ajar electrical signal indication from said door jamb switch means.

5. Apparatus in accordance with claim 1 wherein said drive means includes:
   (a) an electrical reversible drive motor for driving the door locks to a lock or an unlock position;
   (b) a mechanical switch connected to the electrical voltage source and said drive motor for manual application of electrical voltage signals to said drive motor so as to permit said drive motor to be driven manually;
   (c) a relay having a relay contact connected between said mechanical switch and said drive motor in a manner so as to permit said drive motor to be driven in response to the pulse signal from said mono-stable multivibrator, and;
   (d) another pulse delay circuit means disposed between said relay and said mono-stable mutivibrator that provides a path that delays for a predetermined duration the pulse signal from said mono-stable multivibrator said another delay circuit also including circuit for inverting the pulse signal to a suitable polarity for activating said relay, said another pulse delay circuit means also providing a reset signal to said bistable latch means for resetting said latch means to an initial state, wherein the initial state renders said latch means to be responsive to another electrical signal from said jamb switch means.

* * * * *